United States Patent [19]
Cannetti

[11] Patent Number: 5,233,675
[45] Date of Patent: Aug. 3, 1993

[54] FIBER OPTIC ADAPTER WITH REPLACEABLE ATTENUATION MEANS

[75] Inventor: Robert J. Cannetti, Deer Park, N.Y.

[73] Assignee: Porta Systems Corp., Syosset, N.Y.

[21] Appl. No.: 860,176

[22] Filed: Mar. 30, 1992

[51] Int. Cl.⁵ .................................. G02B 6/38
[52] U.S. Cl. ....................... 385/75; 385/140
[58] Field of Search ............... 385/58, 56, 66, 75, 385/60, 140

[56] References Cited

U.S. PATENT DOCUMENTS

| | | | |
|---|---|---|---|
| 4,834,487 | 5/1989 | Abendschein et al. | 385/75 |
| 4,878,730 | 11/1989 | Wall | 385/140 |
| 5,113,463 | 5/1992 | Nodari | 385/58 |

*Primary Examiner*—John D. Lee
*Assistant Examiner*—John Ngo

[57] ABSTRACT

An improved fiber optic connector including a selectively positioned attenuation barrel which forms part of a connector plug. As contrasted with the prior art construction which it replaces, structure is provided for preventing rotational movement of the attenuation barrel relative to an adapter body element of the connector in the form of a rotary locking ring, so that upon interconnection, any relative rotation between the abutted finished ends of a pair of fiber optic cores is prevented, thereby eliminating any possible abrasive action therebetween.

5 Claims, 4 Drawing Sheets

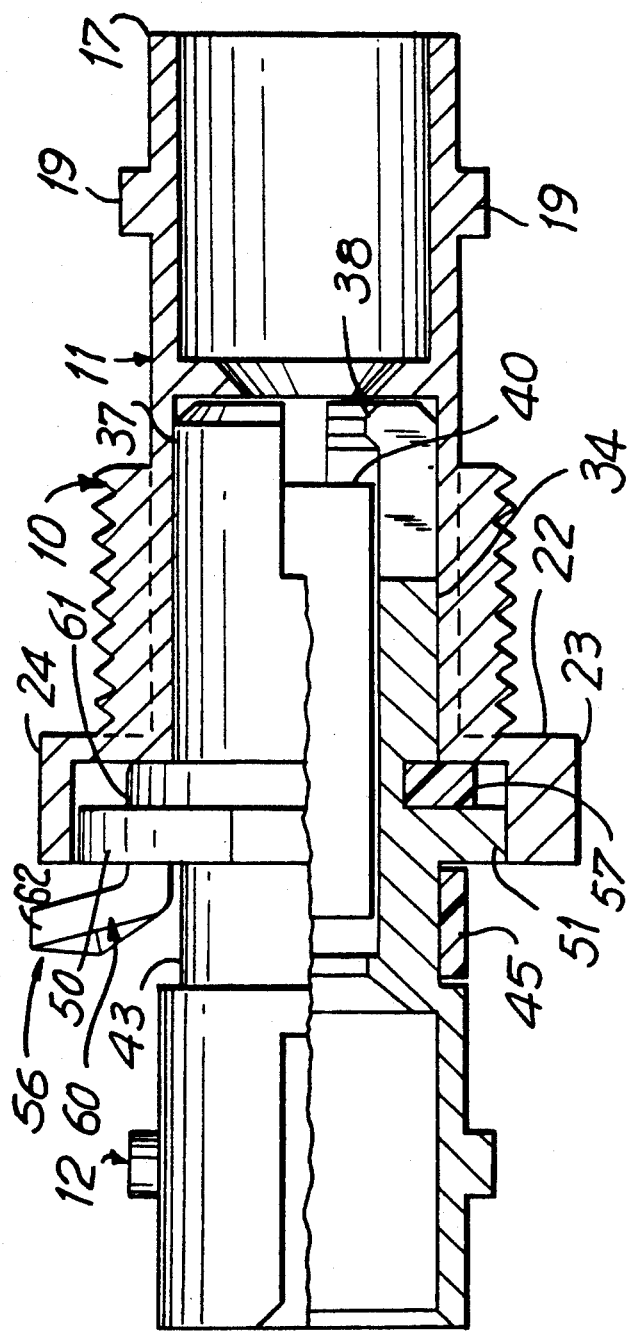
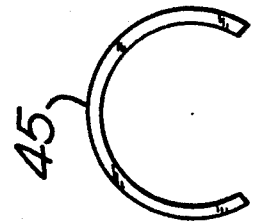

FIBER OPTIC ADAPTER WITH REPLACEABLE ATTENUATION MEANS

BACKGROUND OF THE INVENTION

This invention relates generally to the field of fiber optic connectors used in the telecommunications industry, and more particularly to an improved ST type adapter for interconnecting the finished ends of a pair of fiber optic cables.

It is known in the art to accomplish such interconnections by means of a wide variety of coupling devices, the interconnection often being made through an opening in a wall or bulk head. A commonly used device is known in the art as a type ST adapter which couples a pair of connector plugs, each carrying the polished end of a fiber optic core. The ends of the plugs are interconnected by an adapter body or block which includes mounting means fitting an opening in the wall or bulk head. The plugs are engaged on either side of the adapter, which engagement also aligns the fibers in coaxial relation.

It is common practice to provide, at the adapter body, a means for introducing a degree of attenuation to the transmitted light signal. The most convenient means of providing such attenuation is to include means to space the abutted ends of the aligned cores a variable axial distance. It is known in the art to provide threadedly adjustable means for this purpose. It is usually more convenient to provide a selectively replaceable component which is part of the adapter body chosen from a group of such components which imparts a fixed degree of separation of the ends of the cable cores, depending upon the degree of attenuation required. Each member of such group is identified by an assigned color coding, and in each case, engagement of an attenuator barrel with the adapter body base is by means of a bayonet fitting having automatic latching means, which means is disengaged by a tool to permit disengagement.

While convenient to use, this construction, during engagement, requires a relative rotational movement between barrel and base which results in rotating the polished end surface of one of the cores relative to the other. Where the faces are in abutting contact during this movement, the faces may, in some instances, be subject to a corresponding rotational rubbing action which imparts minute circular scratches on one or both of the finished end surfaces, with accompanying reduction in light transmitting ability. Should the attenuator barrel element be removed to be replaced by another, the identical rubbing action is repeated in an opposite rotational direction.

SUMMARY OF THE INVENTION

Briefly stated, the invention contemplates the provision of an attenuation barrel element of improved form in which the installation is performed without the necessity of rotating one fiber optic finished end relative to an oppositely disposed finished end with which it is in contact, while retaining the bayonet type engagement of the attenuation barrel element upon the adapter body base. To this end, the bayonet engaging structure is formed as a separately rotatable sleeve, and the main body of the attenuation barrel element is provided with keyed means for preventing relative rotation between it and the adapter body base. This construction eliminates the need for a separate latching structure and the above-mentioned tool for releasing the same. (Due to the lock-/un-lock lever being readily accessible without need for a tool.)

Another object of the invention contemplates an improved form of color coding structure in which the main body of the attenuator barrel element is provided with an annular groove which receives a color coded annular split band resiliently retained thereon.

Still another object of the invention lies in the provision of a novel resilient retaining means for holding a known ferrule alignment sleeve within the attenuator barrel element, thereby eliminating the need for a separate snap ring at one end of the element for this purpose.

These objects will be more fully disclosed during the course of the following disclosure, and be pointed out in the appended claims.

BRIEF DESCRIPTION OF THE DRAWINGS

In the drawings, to which reference will be made in the specification, similar reference characters have been employed to designate corresponding parts throughout the several

FIG. 13 is a side elevational assembled view.

FIG. 14 is an end view of a color coded band.

DETAILED DESCRIPTION OF THE DISCLOSED EMBODIMENT

Figure 1:
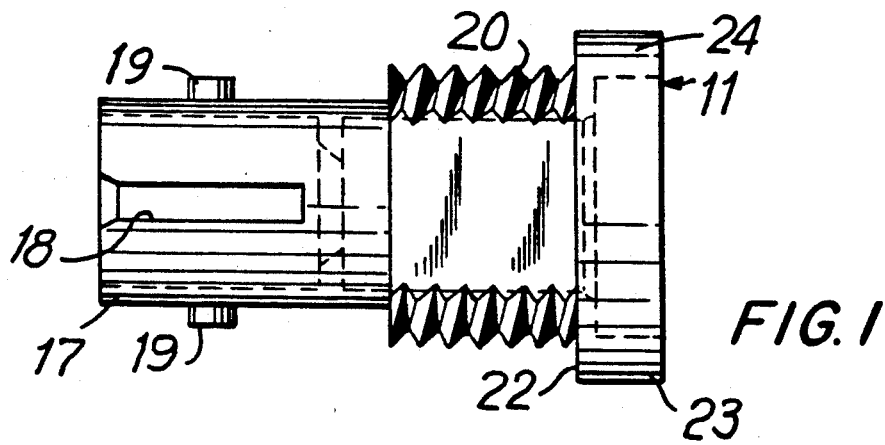
FIG. 1 is a side elevational view of an ST type adapter body forming a part of the disclosed embodiment.
Figure 2:
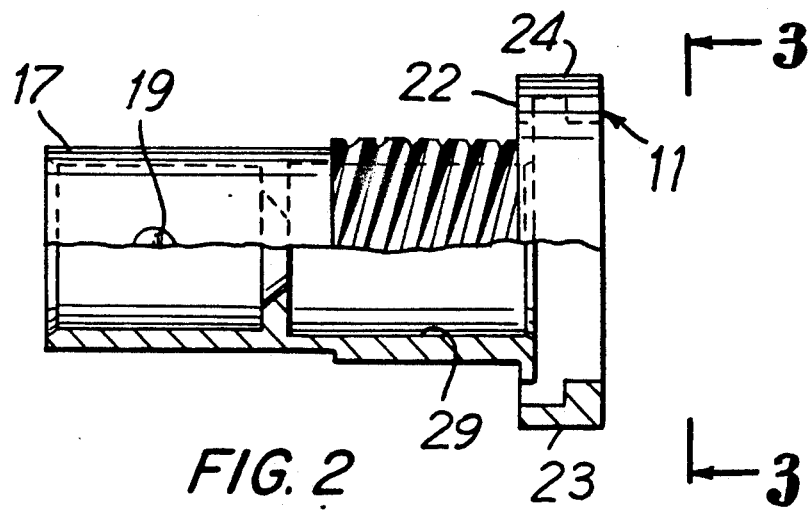
FIG. 2 is a side elevational view thereof, partly in section, as seen from the lower part of FIG. 1.
Figure 3:
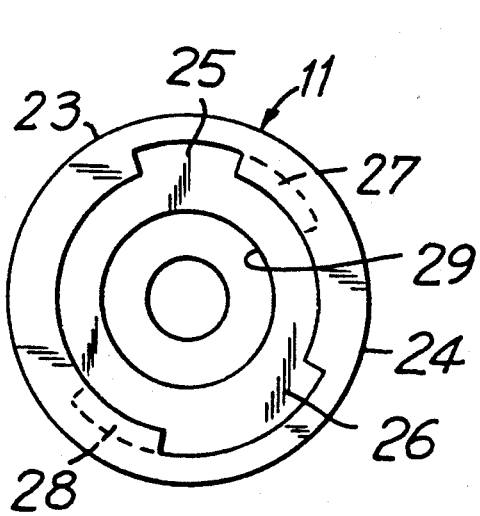
FIG. 3 is an end elevational view thereof.
Figure 4:
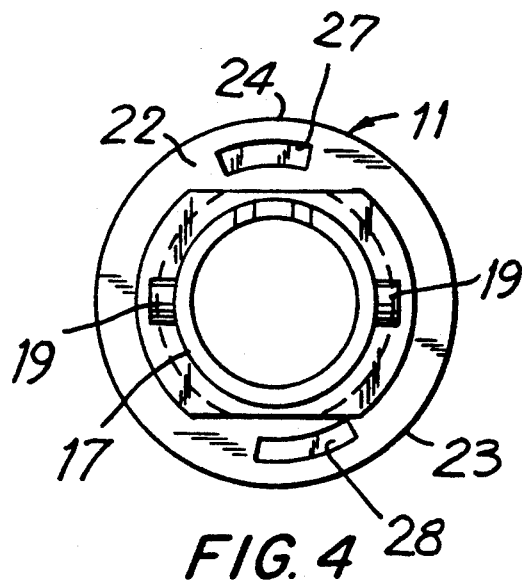
FIG. 4 is an end elevational view thereof, showing the end opposite that seen in FIG. 3.

In accordance with the invention, the device, generally indicated by reference character 10 (FIG. 13), is in the form of an ST adapter, including a main body base element 11 and a selectively engageable attenuation barrel element 12.

The main body element 11 is of known configuration, including an elongated hollow shank 17 having a keyed slot 18 and a pair of bayonet lugs 19 for engaging the corresponding structure on a connector plug element (not shown). A portion 20 of an outer surface is threaded for engagement by an internally threaded nut member (not shown) which abuts a radially extending surface 22 of a bayonet mount 23 to enable the element 11 to be secured within a circular opening in a wall or bulk head (not shown).

The bayonet mount 23 is also of known configuration including an axially disposed flange 24 having a pair of axially aligned slots 25 and 26 communicating with a corresponding pair of radially extending slots 27 and 28. The body includes an axially aligned bore 29 for reception of the attenuation barrel element 12.

The attenuation barrel element 12 (FIGS. 5 and 6) is one of a group of such elements which are of identical configuration, but containing variable attenuation values to enable a pair of aligned cable cores to be positioned with the finished ends thereof abutting varying attenuating elements to enable the introduction of a required degree of attenuation. Each includes an outer sleeve member 31 having an alignment slot 32 and a pair of bayonet lugs 33 engaging the plug element. A second outer sleeve 34 is of slightly reduced diameter, and includes an outer surface 35 engageable within the bore 29. A plurality of axially oriented slots 36 defines a corresponding plurality of resilient end portions 37, each having an inwardly directed projection 38 thereon. The projections may be spread radially to permit the insertion of a known alignment sleeve 40 engaged at each end by known typical ceramic ferrules which support the core of a fiber optic cable in known manner. The opposite end 39 is provided with an orificed abutment, whereby upon contraction of the portions 37, the alignment sleeve 40 is captivated. This construction permits the elimination of a known type radially expandable snap ring, and materially facilitates the insertion of the alignment sleeve 40.

The outer surface 31 of the element 12 is provided with a first annular recess 43 which accommodates a resilient color coded band 45, as seen in FIG. 14, which may be conveniently engaged thereon, the band serving to identify the degree of attenuation provided by the particular element 12.

Figure 5:
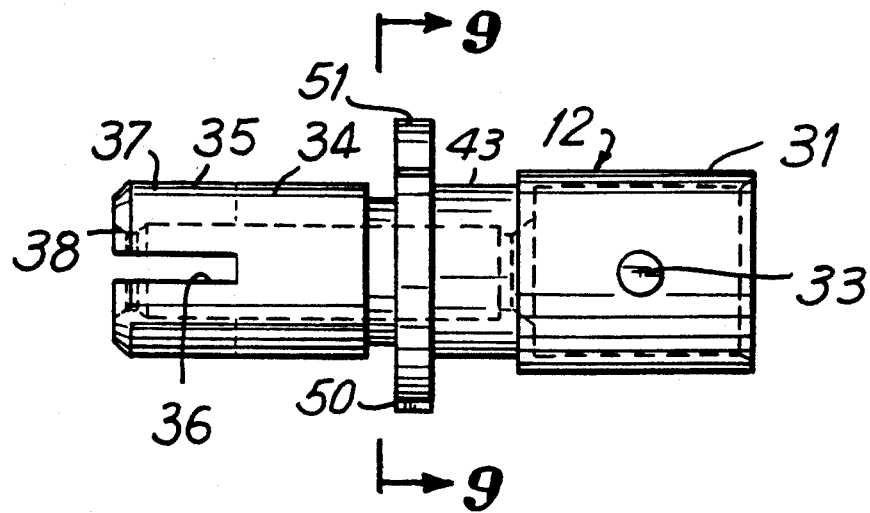
FIG. 5 is a side elevational view of an attenuation element or body forming a second part of the embodiment.
Figure 6:
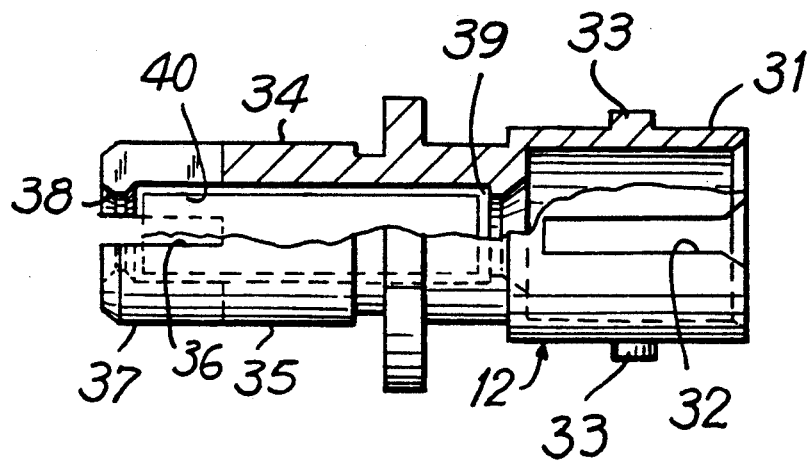
FIG. 6 is a longitudinal sectional view thereof.
Figure 7:
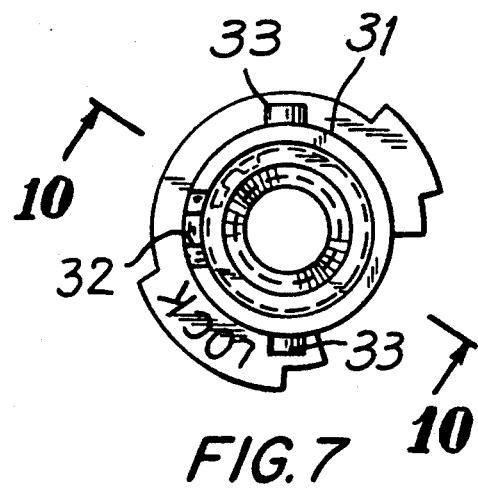
FIG. 7 is an end elevational view thereof.
Figure 8:
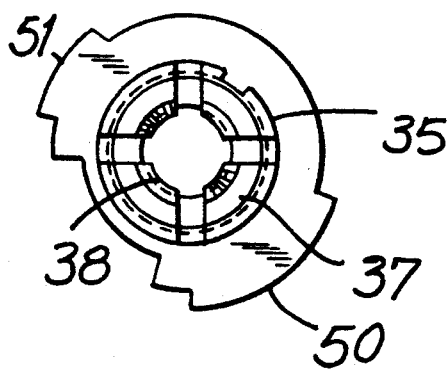
FIG. 8 is a second end elevational view thereof.
Figure 9:
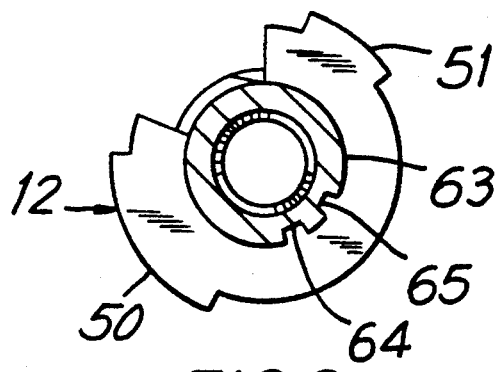
FIG. 9 is a transverse sectional view thereof as seen from the plane 9—9 in FIG. 5.
Figure 10:
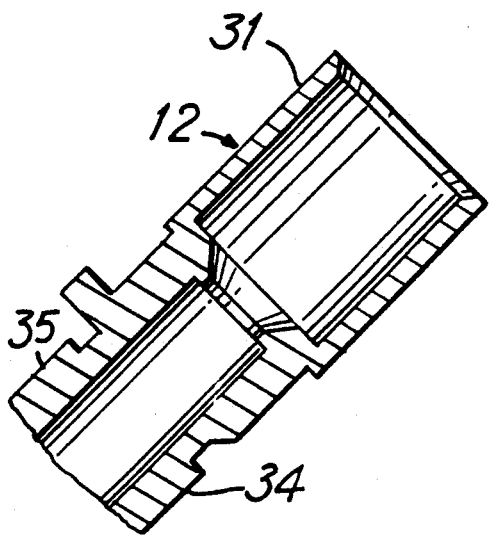
FIG. 10 is a fragmentary sectional view as seen form the plane 10—10 in FIG. 7.

Referring to FIGS. 5 and 9 in the drawings, the barrel element 12 is provided with a first larger bayonet lug 50, and a second smaller lug 51 which project radially therefrom, and are adapted to engage the axially aligned slots 25 and 26 in the main body element 11. They are positioned such that the resultant axial thickness is sufficient to prevent subsequent rotation to engage the radial slots 27 and 28, as is normally the case in known construction. Instead, the engagement of the lugs 50 and 51 within the slots 25 and 26 axially positions the element 12 with respect to the element 11, while simultaneously preventing any relative rotation therebetween. This action prevents any accompanying relative rotation between the polished end surfaces of the coupled fiber optic cores, and the abrading or scratching action described hereinabove.

Figure 11:
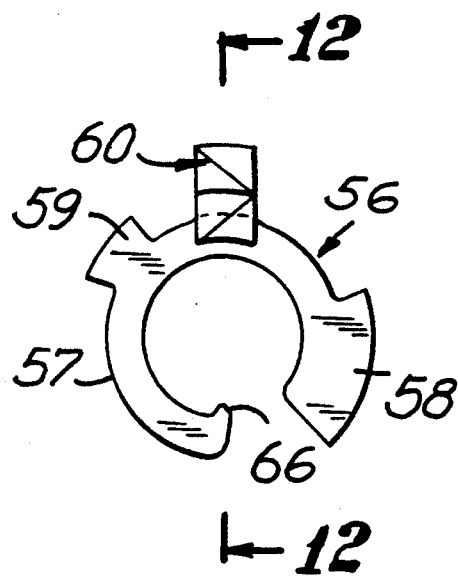
FIG. 11 is a side elevational view of a locking ring element.
Figure 12:
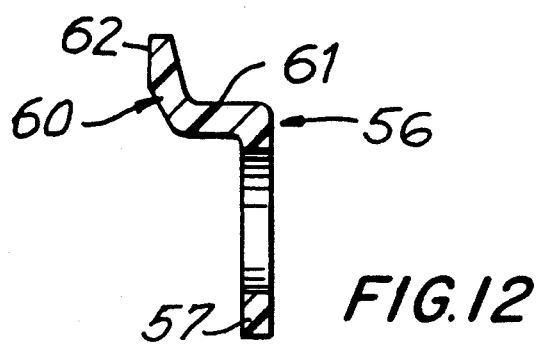
FIG. 12 is a sectional view as seen from the plane 12—12 in FIG. 11.

To prevent disengagement of the lugs 50 and 51, a separately rotatable locking ring element 56 is provided (See FIGS. 11 and 12). The ring element is formed of synthetic resinous materials having a suitable degree of resiliency, and includes an annular body 57 from which radially extend first and second bayonet lugs 58 and 59 which are positioned such that their axial thickness enables rotational engagement into slots 25 and 26. The ring element 56 is positioned parallel and in abutting relation to the lugs 50 and 51, and in open or disengaged condition, the lugs 58 and 59 are substantially congruent with respect to the lugs 50 and 51. This relationship prevents engagement of the lugs 50 and 51 within the slots 25 and 26 if the ring element 56 is not in open condition. Once engaged, the lugs 58 and 59 can then be aligned with the slots 27 and 28 via rotational movement of a manually engageable member 60. The member 60 includes an axially oriented portion 61 providing necessary clearance, and a radially extending portion 62, the end of which is conveniently accessible.

Referring to FIGS. 9 and 11, the body element 12 is provided with an annular groove 63 which accommodates the ring element 56. The groove 63 includes a pair of locking notches 64 and 65 selectively engaged by a projection 66 on the annular body 57, so that the ring is resiliently retained at either end of its rotational path of travel. Thus, once the elements 11 and 12 are fully engaged, they are not accidentally disconnected, and once the locking ring element 56 is moved to open condition, it is maintained in this condition until subsequently manually reengaged. The movement between the ends of the rotational path of travel is disclosed to the user by a clicking sound as the limit at either end is reached when the projection 66 engages one of the notches 64, thus facilitating operation under conditions where the device is not fully in view of the user.

It will be observed that when a connector plug (not shown) with its projecting ferrule, is engaged with the element 12, this will be in the known manner, the plug engaging the outer sleeve member 31. The element 12 may then be interconnected with the main body element 11 in the manner above described, which engagement will normally bring the finished end of a supported optical fiber into direct contact with a corresponding end of an oppositely disposed fiber. However, since, after seating, the element 12 cannot be rotated with respect to the element 11, there is no occasion in which the finished abutted ends of the optical fibers can be rubbed against each other, and the above-described undesirable scratching of the finished end surfaces is effectively prevented.

It will be observed that the construction of the element 12 is such that it may be readily employed with existing main body elements 11 having a conventional female bayonet element thereon, thus making it unnecessary to replace any previously installed main body elements encountered in the field.

I wish it to be understood that I do not consider the invention to be limited to the precise details of structure shown and set forth in this specification, for obvious modifications will occur to those skilled in the art to which the invention pertains.

I claim:

1. In a fiber optic cable connector of a type including a connector plug element engaging one end of an adapter body, said body having means for engaging a corresponding connector plug on an oppositely disposed end thereof, said adapter body including a replaceable barrel element engaging said lug element for imparting a degree of attenuation in an interconnected pair of fiber optical cables by substituting said replaceable barrel element abutting finished ends of aligned cores of said cables, said adapter body including a bayonet socket for engaging said replaceable element by rotationally engaging corresponding projections thereon, the improvement comprising: said replaceable barrel element having at least one projection thereon for engaging said bayonet socket in predetermined non-rotational relation to establish a fixed coaxial relation therewith, and a locking ring element rotationally mounted on said replaceable barrel element, said locking ring element having radially extending projections thereon engaging said socket after engagement of said at least one projection with said bayonet socket; whereby said replaceable element is engaged with said adapter body element without relative rotation therebetween.

2. The improvement set forth in claim 1, said replaceable element including a groove on an outer cylindrical surface thereof, and a color coded resilient ring resiliently engaged within said groove to identify the degree of attenuation of said replaceable element.

3. The improvement set forth in claim 1, further characterized in said replaceable element including an axially disposed bore therein for supporting a ferrule alignment sleeve, said bore including a resiliently expandable end portion permitting introduction of said sleeve within said bore, and subsequent contraction thereof to retain said alignment sleeve within said bore.

4. The improvement set forth in claim 1 in which said locking ring element includes a manually engageable member including an axially oriented portion providing rotational clearance, and a radially oriented portion facilitating manual access.

5. The improvement set forth in claim 4 in which the rotational position of the locking ring element is determined by detent means providing an audible sound upon engagement at either end of the rotational path of travel of said locking ring element.

* * * * *